Jan. 6, 1959 T. F. LOUGHRY ET AL 2,867,512
PEBBLE HEAT EXCHANGE APPARATUS
Filed April 15, 1955 3 Sheets-Sheet 2
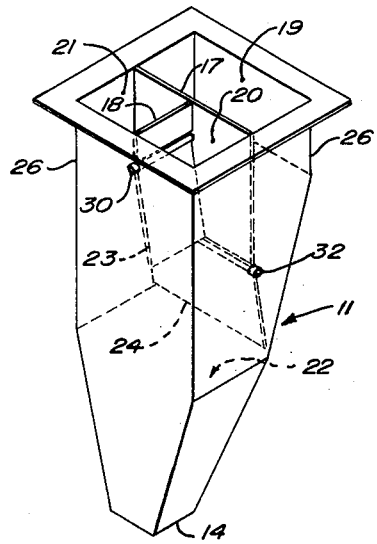
_Fig_II_
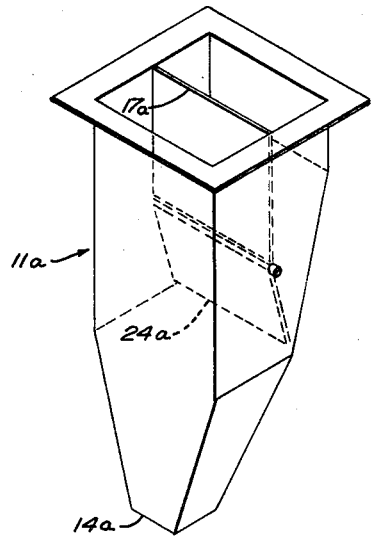
_Fig_III_
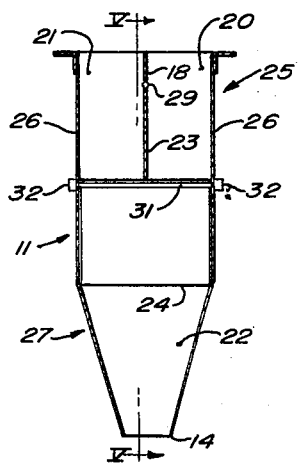
_Fig_IV_
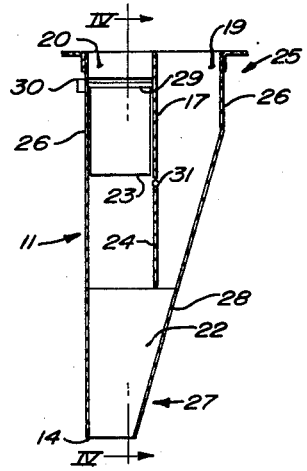
_Fig_V_
INVENTORS
THEODORE F. LOUGHRY
ROBERT M. ESCOTT
BY
Charles S. Haughey
ATTORNEY

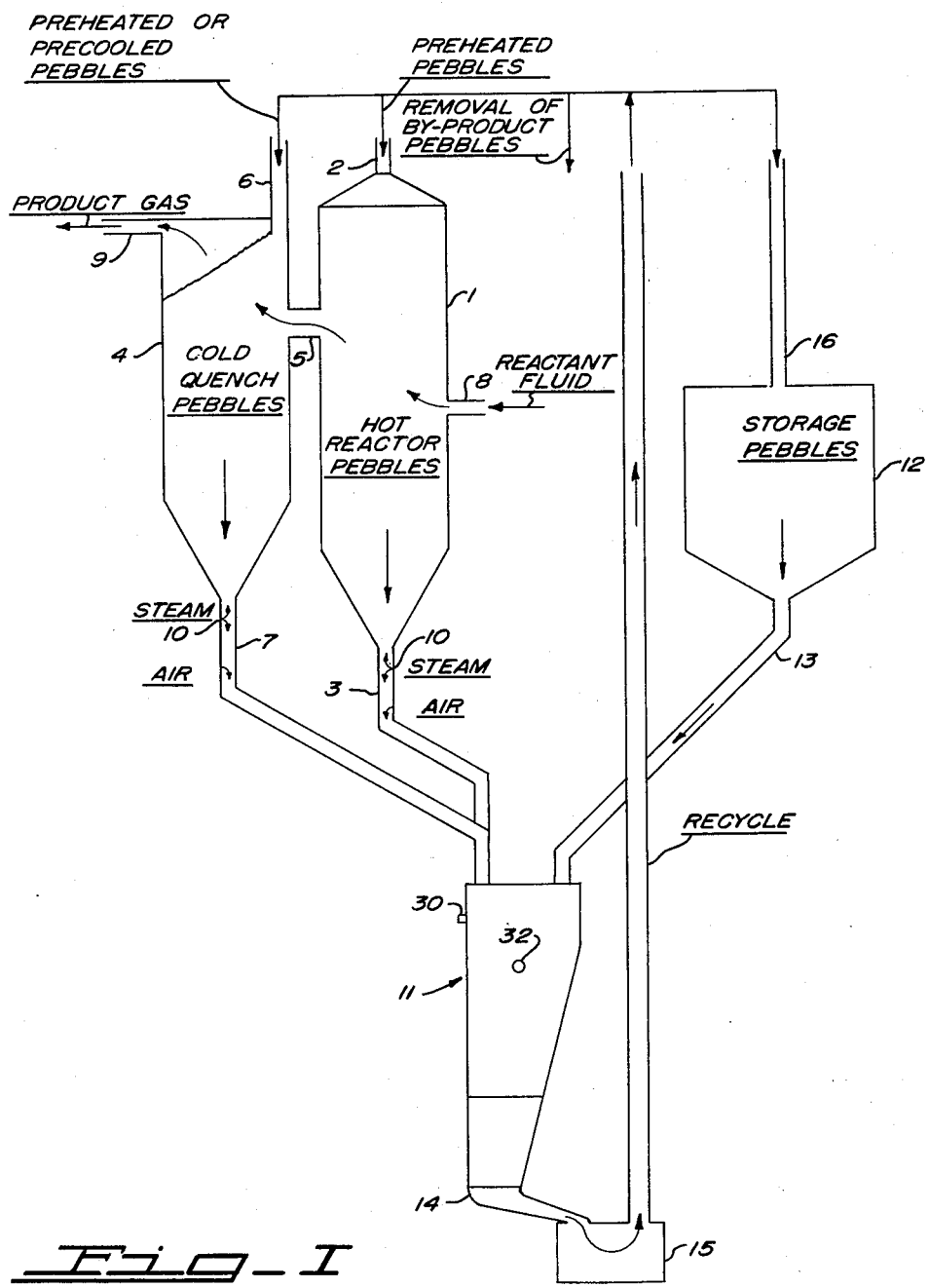
Fig. I

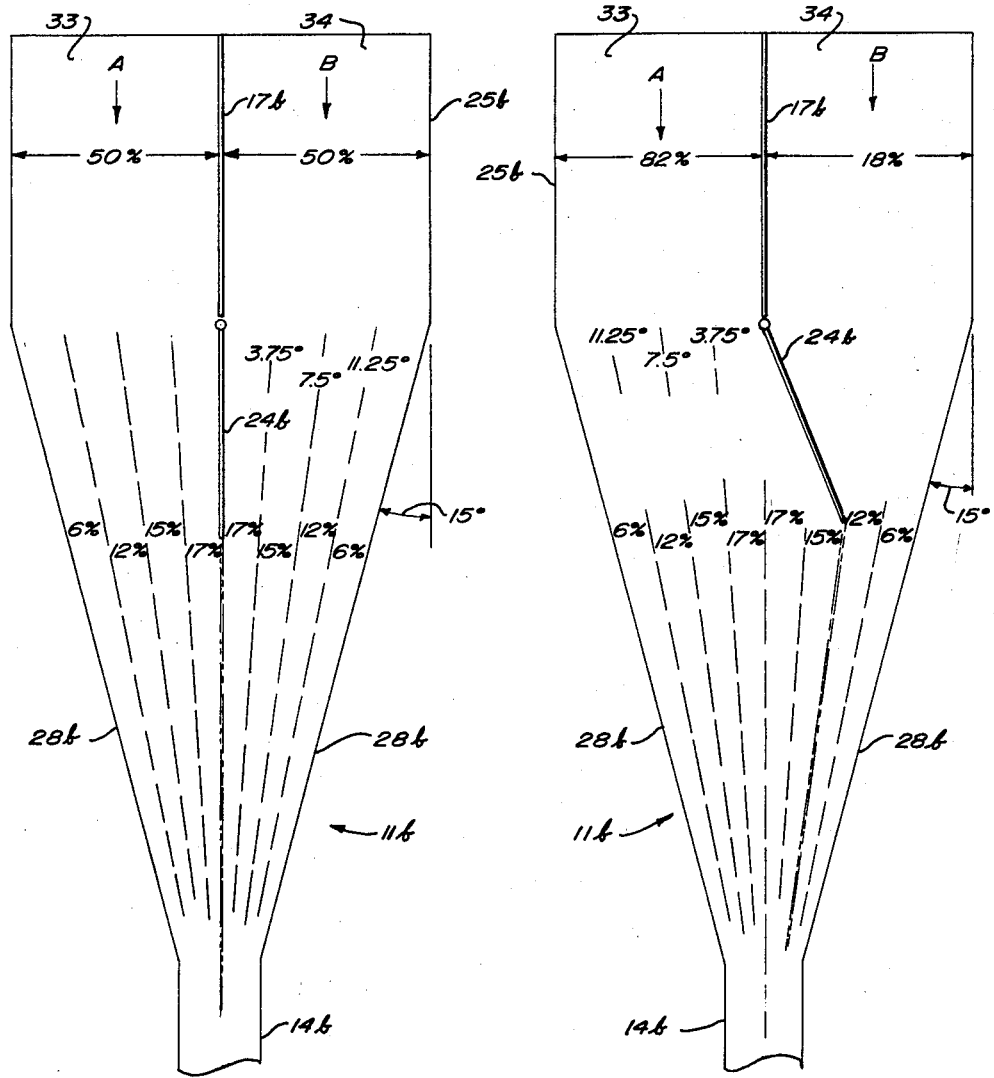

United States Patent Office 2,867,512
Patented Jan. 6, 1959

2,867,512

PEBBLE HEAT EXCHANGE APPARATUS

Theodore F. Loughry and Robert M. Escott, Toledo, Ohio, assignors to Surface Combustion Corporation, Toledo, Ohio, a corporation of Ohio Application April 15, 1955, Serial No. 501,656

5 Claims. (Cl. 23—284)

This invention relates to pebble heat exchange apparatus utilizing flowing masses of solid pebbles of heat exchange material, which material is heated or cooled to a desired temperature by passing a first heat exchange fluid therethrough in a first direct heat exchange step and is then caused to contact a second heat exchange fluid in a second direct heat exchange step so as to heat or cool the second heat exchange fluid, and to processes carried out in such apparatus.

The materials with the handling and treatment of which the invention is concerned are those consisting of discrete particles distinguished by the property of flowing freely in bulk non-fluidized state as when discharged from a bin or hopper, in contrast to finely divided and powdered materials which tend to pack and do not flow freely unless converted to fluidized condition and are handled as flowing liquids. In the case of discrete particles of substantial size, as of the order of one mm. and above, no appreciable time is involved in settling in a bed.

The solid heat exchange materials which are used in pebble heat exchange apparatus are generally called "pebbles." The term "pebbles" as used herein denotes any solid material of flowable size and form which has sufficient chemical and physical stability and mechanical strength at high temperatures to carry large amounts of heat from one heat exchange chamber to another without rapid deterioration or substantial breakage. Pebbles which are used in pebble heat exchange apparatus are generally spheroidal and range from about one-eighth inch to about one inch in diameter. Pebbles charged as cylinders become spheroids shortly with the attrition of use. The pebbles most useful are composed of petroleum coke, metal alloys and ceramics. Any such heat exchange material may be used, either alone or in admixture with other materials.

In many processes which are carried out in pebble heat exchange apparatus, flowing masses of pebbles are divided into separate streams, e. g., one stream may be relatively cold for quenching and one stream may be relatively hot for cracking, which separate streams must be accurately proportioned in order to obtain satisfactory results. Heretofore, devices used for proportioning the separate streams have not given accurate results especially when the separate stream flows were nearly equal and during periods of low rates of flow. Furthermore, none of the prior art devices provided means for proportioning the separate streams independently of variations in the total flow of the streams, i. e., the total flow could not be varied without influencing the relative flows of the separate streams and vice versa.

The unsatisfactory results flowing from the use of the prior art devices were generally caused by the occurrence in chambers or compartments through which the separate streams flow of weirs forming spaces unoccupied by pebbles. The volume of such unoccupied spaces unpredicably changed with changes in the rates of stream flows and with the angle of repose (hereinafter defined) of the pebbles so that the devices were inaccurate. An incidental disadvantage of having the prior art proportioning devices operating with spaces unoccupied by pebbles was that such spaces often broke gas seals formed by the contiguous solid beds of flowing pebbles.

Generally stated, the principal object of this invention is to provide heat treating apparatus equipped with means for accurately proportioning moving masses of solid materials consisting of discrete particles.

More specifically, the principal object of this invention is to provide heat treating apparatus having one or more chambers or compartments through which flow separate streams of moving masses of solid materials consisting of discrete particles and means for adjusting the relative rates of flow of such separate streams independently of variations in the total flow, while such chambers or compartments are kept completely occupied by the solid materials in their flow paths, whereby in the composite particulate mass of materials delivered by the apparatus or device the constituents derived respectively from the separate streams may be accurately proportioned.

Another object of the invention is to provide, in apparatus for thermal cracking of hydrocarbons in the presence of solid materials consisting of discrete particles, a device for accurately proportioning masses of the solid materials moving through the apparatus.

More specific objects and advantages are apparent from the following description, in which reference is had to the accompanying drawings illustrating preferred embodiments of the invention.

Figure I of the drawings is a schematic illustration of apparatus and process for thermal cracking of hydrocarbons in the presence of solid materials consisting of discrete particles.

Figure II is an enlarged perspective view of a proportioning device for the solid materials, which device is shown diagrammatically in Figure I.

Figure III is a perspective view of a modified proportioning device.

Figure IV is a vertical sectional view of the device shown in Figure II taken along the line IV—IV of Figure V.

Figure V is a vertical sectional view of the device shown in Figure II taken along the line V—V of Figure IV.

Figure VI is a schematic illustration of the flow patterns of the streams of moving masses of solid materials consisting of discrete particles passing through a proportioning device having slanted discharge walls.

Figure VII is a schematic illustration showing the effect on the flow patterns illustrated in Figure VI when a hinged plate is swung into the path of one separate stream of descending material.

These specific drawings and the specific description that follows merely disclose and illustrate the invention, and are not intended to impose limitations upon the claims.

The device of the present invention includes a chamber having a plurality of open topped and open bottomed compartments in its upper portion each for receival of a separate stream of material and a single space in its lower portion for receival and subsequent common discharge of all the streams of material, and means for adjusting the relative flows of the separate streams independently of variations in the total flow through the common discharge.

Referring particularly to Figure I of the drawings, cracking apparatus having a proportioning device according to the invention includes an upright cracking chamber 1 having a centrally disposed pebble inlet conduit 2 at its upper end and a centrally disposed pebble outlet conduit 3 at its lower end. An upright quench chamber 4 is located adjacent to but spaced apart from the cracking chamber 1 and communicates with the cracking chamber through a crossover connection 5. The quench chamber 4 has a pebble inlet conduit 6 at its upper end and a centrally disposed pebble outlet conduit 7 at its lower end. Reactant fluids, e. g., raw liquid hydrocarbon feed-stocks, may be introduced into the cracking chamber 1 through a conduit 8 shown in Figure I diagrammatically as communicating with the chamber at a single point. However, the conduit 8 may communicate with the chamber at several points by means of a header or by means of a plurality of branch conduits. Product gas is discharged from the quench chamber 4 through a conduit 9 communicating with the top of the chamber.

In operation of the cracking apparatus, two major streams of solid materials consisting of discrete particles called "pebbles" are permitted to flow into the chambers 1 and 4. The main stream of pebbles is preheated to a cracking temperature of 1500° to 1600° F. and is passed through the cracking contacting area in the cracking chamber 1 as an initially dry flowable bed. A secondary stream of pebbles is preheated or precooled to a controlled quenching temperature below 1500° F. and is passed through the quench contacting area in the quench chamber 4 as an initially dry flowable bed.

Reactant fluids are introduced through the conduit 8 into the cracking chamber 1 where the hot pebbles provide heat of reaction and product gas is formed. Residual carbon, uncracked oil and condensed liquids deposit upon and wet the pebbles thus increasing the total volume of the pebbles. The hot gases and vapors which have been released in the cracking chamber 1 enter the quench chamber 4 through the crossover connection 5 where they are quenched very rapidly to the temperature of the quench pebbles to inhibit undesirable reactions, such as reactions forming pitch. Liquids condense on the pebbles during the quenching operation and wet the pebbles this increasing the total volume of the pebbles. The quenched product gas is discharged through the conduit 9 communicating with the top of the quench chamber 4. The wet pebbles are dried as they proceed downwardly from the chambers 1 and 4 and they pass through the outlets 3 and 7 wherein they may be further chemically dried by introducing air or oxygen directly into the pebble outlets 3 and 7 in concurrent flow with the pebbles as indicated in Figure I. The air or oxygen is introduced below steam seals indicated at 10 in Figure I so that nitrogen or other diluent in the air or oxygen cannot enter into the product gas stream.

The dried pebbles proceed downwardly through the outlets 3 and 7 into a proportioning hopper or chamber 11 which acts as a duct for the pebbles and is utilized to adjust the relative flows of the separate streams of pebbles. The three chambers 1, 4 and 11 and the outlet ducts 3 and 7 are always completely flooded with a contiguous bed of pebbles so that there are no unoccupied spaces in the pebble flow paths. A third stream of pebbles flowing from a storage chamber 12 is added to the sum of the two major streams in the proportioning chamber 11, the storage chamber 12 being useful in removing fines and oversized pebbles. It is connected to the proportioning chamber 11 by means of an outlet 13.

The pebbles are withdrawn from the proportioning chamber 11 through a discharge spout 14 in the bottom of the chamber by any continuously or intermittently operated means such as a screw conveyor, belt, vibratory conveyor, shovel or, as shown in Figure I, a lift pot 15 from where they are raised to the top of the apparatus by means of a gas stream to be reused. The increase in volume of the pebbles, caused by the coking of the pebbles, is continuously removed as a by-product as indicated in Figure I or stored in chamber 12 for later removal. The pebbles are then divided into three streams, one going to the cracking chamber 1 through the inlet 2, one going to the quench chamber 4 through the inlet 6 and one going through the storage chamber 12 through an inlet 16 and an outlet 13.

The proportioning chamber 11 includes a pair of vertical partitions 17 and 18 (Figures II, IV and V) dividing its upper portion into three open topped and open bottomed compartments 19, 20 and 21 and a single space 22 in its lower portion. Each of the compartments 19, 20 and 21 is adapted for receival of a separate stream of pebbles, compartments 20 and 21 receiving one or the other of the streams of pebbles flowing from the cracking chamber 1 and the quench chamber 4 and compartment 19 receiving the stream of pebbles flowing from the storage chamber 12. The space 22 in the lower portion of the proportioning chamber 11 receives the combined streams of pebbles descending from the compartments 19, 20 and 21 and terminates in the spout 14 from which a common discharge of all the streams of pebbles is made to the lift pot 15 which controls the total rate of flow of pebbles from the spout 14.

The vertical partitions 18 and 17 in the upper portion of the proportioning chamber 11 are adjustable, since extensions or hinged plates 23 and 24 are hung immediately below and generally parallel to the bottom of each respective partition for adjusting the relative flows of the separate streams independently of variations in the total flow of the combined streams. The hinged plates 23 and 24 may be swung selectively more or less into the path of either separate stream of descending material to vary the rate at which material passing by one side of the plate descends and to vary the rate at which material passing by the other side of the plate descends.

The form of the proportioning chamber 11 comprises a rectangular upper portion 25 with vertical walls 26 and a wedge shaped lower portion 27 formed by the lower part 28 of one of the walls 26 sloping inwardly toward a side of the hinged plate 24 and terminating in the spout 14. The vertical partition 17, which extends between oppositely located walls 26, together with that wall 26 which is located opposite from the sloping lower part 28 support the hinged plate 23. The plate 23 is rigidly attached to a shaft 29 rockably mounted immediately below and generally parallel to the partition 18 which extends between the partition 17 and one of the walls. A knob 30 fixed on an end of the shaft 29 extending through the wall is used to rock the shaft pipe 29 and selectively swing the attached plate 23. Similarly, a shaft 31 is rockably mounted immediately below and generally parallel to the partition 17. The shaft 31 is supported between oppositely located walls 26 and has a knob 32 on each of its ends which extend through the walls. The knobs 32 are used to rock the shaft 31 and selectively swing the plate 24 attached to the shaft. Any suitable means such as a ratchet may be used to hold the knobs 30 and 32 in selected positions. The vertical side edges of the plate 23 are generally parallel to each other and the plate is located between a vertical wall 26 and the vertical partition 17 so that the edges of the plate are very close to the wall and the partition in all positions, as best shown in Figure V. Similarly, the vertical side edges of the plate 24 are generally parallel to each other and the plate is located between vertical walls 26 so that the edges of the plate are very close to the walls in all positions, as best shown in Figure IV.

In the operation of the proportioning chamber 11, the chamber is filled with pebbles and acts as a duct for the pebbles in the apparatus connected above it. The spout 14 and the lift pot 15 act as a dam for the pebbles in the proportioning chamber and the cracking and heat exchange chambers thereabove. The compartments 20 and 21 receive one or the other of the separate streams of pebbles descending from the cracking chamber 1 and the quench chamber 4. The ratio of the separate streams to each other may be varied by selectively swinging the hinged plate 23 more or less into the path of either separate stream of descending pebbles. The elevation of the hinged plate 23 is above that of the hinged plate 24 and the orientation of the plates is such that the pebbles descending on both sides of the upper plate 23 combine and the combined stream flows past one side of the lower plate 24. The compartment 19 receives the stream of pebbles flowing from the storage chamber 12, which stream descends past the other side of the plate 24. The ratio of the stream formed by the combined stream of pebbles descending from the compartments 20 and 21 and past one side of the lower plate 24 and the stream of pebbles flowing past the other side of lower plate 24 to each other may be varied by selectively swinging the plate 24 more or less into the path of either separate stream of descending pebbles. A common discharge of all the streams of pebbles is then made to the lift pot 15.

The total of the amounts of pebbles descending through the proportioning chamber 11 is always equal to the amount withdrawn from the spout 14, whether the withdrawal is continuous or intermittent, since the chamber is always filled with pebbles. Hence, the hinged plates 23 and 24 may be set for any desired proportioning and need not be adjusted when the rate of withdrawal is changed. Thus, the rate of withdrawal can be predetermined or metered independently from the predetermined proportioning of the constituents. Heretofore, proportioning chambers were generally not completely occupied by pebbles. The pebbles were poured into the prior art chambers in piles and assumed the angle of repose which may be defined as that angle, taken from the horizontal, which the top of a mass of solid materials consisting of discrete particles will assume when poured from a central outlet. The angle of repose, in the case of pebbles, may vary between 30 degrees and 45 degrees depending upon the size, shape and surface characteristics of the pebbles. The volume of the unoccupied spaces unpredicably changed with changes in the rates of stream flows and with the angle of repose of the pebbles so that the prior art devices were inaccurate and could not proportion the separate streams of pebbles independently of variations in the total flow of the streams.

A proportioning chamber 11a illustrated in Figure III is designed to handle two ingredients. The device has one partition 17a and a hinged plate 24a, corresponding to the like parts in Figures II, IV and V, which supply two ingredients, such as relatively cold and hot pebbles and other non-liquid flowable materials, in predetermined ratio to each other. The combined ingredients are discharged from a common discharge spout 14a, being withdrawn by a screw conveyor, belt, lift pot, vibratory conveyor, shovel or any other continuously or intermittently operating means. When the hinged plate 24a is swung into and held in the path of material descending from one side, the rate at which material descends from that side is decreased while the rate at which material descends from other side is increased, but the total of the rates of descent from both sides is not changed.

It has been discovered that the centers of the pebble beds in the proportioning chambers 11 and 11a tend to drop out of the discharge spouts 14 and 14a in the bottoms of the respective chambers faster than the peripheries at all levels in the pebble beds. This phenomenon is most apparent in the wedge shaped lower portions of the chambers where the sides slope inwardly. While the hinged plates 23 and 24 lie in the same vertical planes as the respective partitions 18 and 17, the amount of material descending from one side of the partitions is equal to the amount descending from the other side. It also has been discovered that when the hinged plates are swung at angles into the paths of material descending from one side the rate at which material descends from that side is decreased while the rate at which material descends from the other side is increased, but the total of the rates of descent from both sides is not changed. The improved proportioning chambers have been designed to take full advantage of the foregoing principles by hanging the hinged plates immediately below and generally parallel to the respective partitions. By sloping the lower part of one of the walls adjacent a hinged plate, a given plate opening will pass fewer pebbles, thus giving greater control of small flow proportions without bridging of the pebbles.

The foregoing principles are illustrated in Figures VI and VII showing, diagrammatically, a proportioning chamber 11b having a lower portion including two lower walls 28b which slope toward sides of a hinged plate 24b located immediately below and generally parallel to a partition 17b dividing a rectangular upper portion 25b of the chamber into a pair of equally sized compartments 33 and 34, corresponding to the like parts in Figures II–V. The compartments 33 and 34 are always kept full of ingredients A and B respectively of mixtures consisting of discrete particles, which ingredients A and B descend through the proportioning chamber 11b when the ingredients are withdrawn from the chamber through a discharge spout 14b.

Figures VI and VII illustrate schematically the flow pattern streams of the ingredients when the walls 28b slope inwardly at 15 degrees from the vertical. A change in the angle of the walls 28b changes the particular flow pattern which is illustrated but does not change the overall general flow pattern, i. e., the center of the discrete particle bed drops out of the spout 14b faster than the periphery. Although such general flow pattern is also exhibited when the walls are vertical, preferably the walls slope inwardly from the vertical to cause those particles passing by the walls to move much slower than those in the center of the bed. This allows a sharper and more accurate control of the separate streams when the hinged plate 24b is swung selectively into the path of the descending particles.

With the walls 28b of the lower portion of the proportioning chamber 11b sloping at 15 degrees from the vertical, about ⅔ of the materials A and B descend through the central ½ of the chamber while only about ⅓ of the materials descend through the outer ½, i. e., as indicated in Figure VI, 34 percent of the materials descend between the vertical flow line and the next adjacent flow lines (the sum of 17 percent on one side of the vertical flow line and 17 percent on the other side) and 30 percent of the materials descend between the next adjacent flow lines or a total of 64 percent of the materials descend through about the central ½ of the chamber. While the hinged plate 24b lies in the same vertical plane as the partition 17b, the amount of material A descending from one side of the partition 17b is equal to the amount of material B descending from the other side, as indicated in Figure VI.

When the hinged plate 24b is swung into the path of material B to the flow line which slopes 7.5 degrees from the vertical, as indicated in Figure VII, the rate at which material B descends is decreased while the rate at which material A descends is increased so that 18 percent of the total material mixture flowing from the discharge spout 14b is composed of material B and 82 percent of the total mixture flowing from the spout is composed of material A. The new flow lines taken above the bottom edge of the plate 24b are not shown. However, the important phenomenon to note is that the total of the rates of descent from both sides is not changed, i. e., 18 percent of material B passes between the same flow lines in both Figures VI and VII. As specifically shown as an example in Figure VII, when the hinged plate 24b is swung into the path of descending material B to the flow line which slopes 7.5 degrees from the vertical, material A sweeps in a curved path completely filling all spaces underneath the plate 24b and exactly increases its flow by that amount by which the flow of material B is decreased to maintain the total flow through the spout constant.

Various modifications may be made in specific details of construction without departing from the spirit and scope of the invention.

What is claimed as new is:

1. Heat treating apparatus comprising, in combination: a first container for hot pebbles; means for heating the pebbles in the first container; a second container for cold pebbles; means for delivering pebbles from a common stream to said first and second containers; a proportioning unit forming a chamber having a vertical partition dividing said chamber into first and second open topped and open bottomed compartments; a first pipe means for delivering a moving mass of pebbles from said first container to said first compartment; second pipe means for delivering a moving mass of pebbles from said second container to said second compartment; a discharge spout connected to the bottom of said chamber for discharging a moving mass of pebbles therethrough; means for withdrawing pebbles from said spout at a sufficiently slow rate to maintain a moving bed of pebbles in said containers, pipe means, and chamber; adjustable means adjacent the bottom of said partition for proportioning the rates of flow of pebbles through said compartments; means for delivering a reactant fluid to said first container; and means for delivering reaction product fluid from said first container to said second container.

2. Heat treating apparatus comprising, in combination: a first container for hot pebbles; a second container for cold pebbles; a proportioning unit forming a chamber having a first partition dividing its upper portion into first and second open topped and open bottomed compartments, and a second partition dividing said first compartment into third and fourth open topped and open bottomed compartments; first pipe means for delivering a moving mass of pebbles from said first container to one of said second, third, and fourth compartments; second pipe means for delivering a moving mass of pebbles from said second container to another one of said second, third, and fourth compartments; means for delivering pebbles to the other of said second, third, and fourth compartments; a first hinged, adjustable plate hung immediately below and generally parallel to said first partition to discharge moving masses of pebbles from said first and second compartments in a ratio which can be varied by adjustment of said hinged plate; and a second hinged, adjustable plate hung immediately below and generally parallel to said second partition to discharge moving masses of pebbles from said third and fourth compartments in a ratio which can be varied by adjustment of said second hinged plate.

3. Apparatus according to claim 2 wherein said proportioning unit comprises at least one side wall sloping inwardly toward a side of the first hinged plate.

4. Cracking apparatus comprising, in combination: a cracking chamber having a conduit for introducing a reactant fluid into the chamber; a quench chamber having a conduit for discharging product gas from the chamber; means forming a gas passage between the cracking chamber and the quench chamber; a storage chamber, each chamber having an inlet at its upper end and an outlet at its lower end; and a device connected to said outlets for proportioning masses of discrete solid particles moving through the chambers, said device being completely occupied by the solid particles in their flow paths at all times and comprising a hopper having a plurality of open topped and open bottomed compartments in its upper portion each for receival of a separate stream of material flowing from the outlets of the chambers and a single space in its lower portion for receival and subsequent common discharge of all the streams of material; and means positioned within said device for adjusting the relative flows of the separate streams independently of variations in the total flow.

5. Cracking apparatus comprising, in combination: a cracking chamber having a conduit for introducing a reactant fluid into the chamber; a quench chamber having a conduit for discharging product gas from the chamber; means forming a gas passage between the cracking chamber and the quench chamber; a storage chamber, each chamber having an inlet at its upper end and an outlet at its lower end; and a device connected to said outlets for proportioning masses of discrete solid particles moving through the chambers, said device comprising a hopper having at least one adjustable partition dividing its upper portion into a plurality of open topped and open bottomed compartments each for receival of a separate stream of material flowing from the outlets of the chambers and a single space in its lower portion for receival and subsequent common discharge of all the streams of material, the adjustable partition serving the additional function of adjusting the relative flows of the separate streams independently of variations in the total flow.

References Cited in the file of this patent

UNITED STATES PATENTS

| 2,513,995 | Eastwood | July 4, 1950 |

FOREIGN PATENTS

| 375,773 | Germany | May 18, 1923 |